United States Patent

[11] 3,590,363

[72] Inventor Ulises A. Sanabria
 Wilmette, Ill.
[21] Appl. No. 770,932
[22] Filed Oct. 28, 1968
[45] Patented June 29, 1971
[73] Assignee Products & Processes, Inc.

[54] GENERATION OF CONSTANT FREQUENCY ALTERNATING CURRENT ENERGY AT VARIABLE SPEEDS OF A GENERATOR
3 Claims, 4 Drawing Figs.

[52] U.S. Cl. ................................................. 322/61,
 307/78, 322/67
[51] Int. Cl. ................................................. H02p 9/42
[50] Field of Search .................................... 322/61, 67;
 307/77, 78, 84

[56] References Cited
 UNITED STATES PATENTS

| | | | |
|---|---|---|---|
| 2,539,273 | 1/1951 | Ringland | 322/61 |
| 2,528,111 | 10/1950 | Buckthal | 322/61 |
| 3,225,286 | 12/1965 | Wysocki | 322/61 |
| 3,454,864 | 7/1969 | Roesel, Jr. | 322/61 X |

Primary Examiner—Oris L. Rader
Assistant Examiner—H. Huberfeld
Attorney—Robert J. Black ABSTRACT: This invention is directed to the generation of fixed frequency alternating current for power purposes from a dynamoelectric machine driven at substantially different speeds. This is accomplished through the use of a series-wound DC motor laminated in accordance with good transformer design. The field of the motor is excited with a current of the desired frequency and approximate voltage of the desired output and the armature is rotated externally in excess of its normal speed as a motor to generate a voltage across its brush terminals which terminals are set in the neutral position as is common in a reversing series motor. The output voltage increases with load increase across the brush terminals until a maximum voltage is soon attained, e.g. 110 volts at no load; 112 volts with 200 watts load; 116 volts with a load of 600 watts and 117 volts with loads from 800 watts to 2.5 kilowatts after which the voltage gradually drops to about 110 at 4 kilowatts. As in an autotransformer the input power, except the $I^2R$ loss, reappears in the output load along with the output of the power generated in the armature. Therefore the variable armature flux, rather than being wasted as in common alternators, generates available current in the field. Inasmuch as the output is always in phase with the input the dynamo may be considered an auto or synchropolar generator. The cascading of two or more of these generators provides a spectacular advantage in that the power developed in each stage is added to the power of the output system resulting in an order of magnitude performance improvement.

INVENTOR
Ulises A. Sanabria
by Rolla N. Carter
Att'y

3,590,363

GENERATION OF CONSTANT FREQUENCY ALTERNATING CURRENT ENERGY AT VARIABLE SPEEDS OF A GENERATOR

THE PRESENT INVENTION

The present invention relates to the generation of alternating current and more particularly to a method and apparatus for generating constant frequency electrical power utilizing rotary generating apparatus driven at variable speeds by a prime mover.

It is known to be quite difficult, as well as expensive, to drive an alternator at a constant speed with mechanical power taken from a shaft rotating at varying speeds.

The general object of the invention is to provide useful amounts of constant frequency alternating current power utilizing variable speed prime movers and requiring relatively minute amounts of electric power input.

Another object of the invention is to improve the overall efficiency of a variable speed-constant frequency electric generating system.

A further object of the invention is to increase greatly the range over which the speed of a constant frequency generator may vary.

Still another object of the invention is to provide a dynamoelectric system capable of delivering large outputs of constant frequency alternating current power at a voltage which deviates within satisfactory limits with changes in speed and load.

Other objects and advantages of the invention will become apparent from the following description, when read in connection with the accompanying drawing in which.

In accordance with the present invention a common series commutator motor wound for conventional reversing use, e.g., two pole construction with the brushes at right angles to the centers of the pole pieces and an armature wound with zero lead, is mechanically driven in the same direction as its motor action when electric power is applied thereto. When alternating current of the frequency and approximate voltage of the desired output is applied and the armature is rotated in excess of its normal speed as a motor, an AC voltage at least as high as, and in phase with the input voltage will be generated across its brush terminals which are connected to a load. As the load increases the output power increases until a maximum is soon attained. It is thus evident that this generator possesses the quality of autogeneration so that, like an autotransformer, the input energy is fully conserved and reappears in the output circuit. These generators also possess the inherent quality of developing opposing magnetic poles synchronously in the armature and the field, and thus the generator is synchropolar because the induced variational flux is always in phase with the input current with the opposing poles eliminating losses inherent in nonsynchropolar design. A cascaded array of these generators not only amplifies but also adds up most of the power in the array with the exception of I²R losses.

Figure 1:
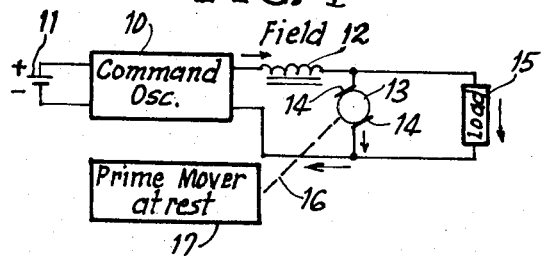
FIGS. 1 and 2 are, respectively, diagrammatic representations of a system embodying the invention at rest and rotating rapidly.

Referring now to the drawing and more particularly to FIG. 1 thereof, a command oscillator 10, which may be a solid state 60-cycle generator is here shown as powered by a battery 11 which may be the storage battery of an automobile engine system. The output of the command source 10 is connected through the series field 12 of a universal type motor having an armature 13 and commutating brushes 14 across which a load 15 is connected. The armature 13 is mechanically coupled through a drive shaft 16 to a prime mover 17, here shown as being at rest. With the armature 13 at rest the current from the output of the command source 10 flows through the field 12 and is divided between the armature 13 and the load 14 in accordance with their respective impedances as indicated by the several arrows. As the prime mover 17 is started and increases in speed it drives the armature 13 through the shaft 16 and when the armature 13 rotates in excess of its normal speed as a motor it will generate a voltage at least as high as, and of the same polarity as the input voltage from the command source 10. If the load 15 connected across the brushes 14 is substantially zero very little current flows from the command source 10, but as the load 15 increases the output voltage across the brushes 14 rises and all currents in the system are increased. It will be noted in FIG. 2 that the current through the armature 13 has reversed from the at-rest position shown in FIG. 1 and, as indicated by the several arrows in FIG. 2, the armature current and the field current are additive in passing through the load 15. When the voltage of the output across the brushes 14 is equal to and tending to be slightly higher than the input voltage from the command source 10 the load 15 can be increased with the maximum benefit, i.e., the "gain" of the generator is maximum. Within the load range of the generator comprised of field 12 and armature 13 the voltage across the brushes 14 increases until a maximum is soon attained where it remains until approximately one-half the load capacity is reached, after which it gradually drops until at full load it is reduced to the no-load voltage. It may be noted that the higher the speed at which the armature 13 is driven the smaller the voltage variation with changes in load. Except for the I²R loss all of the input power from the command source 10 and the power generated in the armature 13 are utilized in the load 15. The variable armature flux, wasted in common alternators, generates utilized current in the field which is why it appears appropriate to refer to the arrangement in accordance with the invention as an auto generator or a synchropolar generator. Inasmuch as the output is always in phase with the input there is little or no current circulating to waste or heat. This system of FIGS. 1 and 2 performs a good amplification of the input power from the command source 10 and, with the proper number of turns in the field winding 12, an input to output ratio of five to one can easily be obtained. By reducing the field turns sufficiently the ratio can be lowered to where there is no gain.

Figure 2:
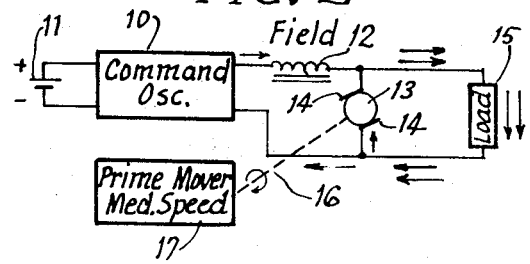

With the system shown in FIGS. 1 and 2 commutation improves as the gain ratio decreases and as field current gets larger and also with decreasing speed. As the load increases both the input current from the command source 10 and the current through the armature 13 increases and it has been found that choosing these currents to be approximately equal works quite well, e.g., 1 watt of input from the command source 10 matched to 1 watt of armature generation results in 2 watts of output to the load 15. Accordingly, when a small capacity command source 10 is desirable several generating stages are appropriately connected in cascade as will be described in connection with FIG. 3. Although it is evident that the command source 10 will be called upon to supply a proportion of the power demand this proportion will be relatively low since it is the reciprocal of the gain of the cascaded stages.

Figure 3:
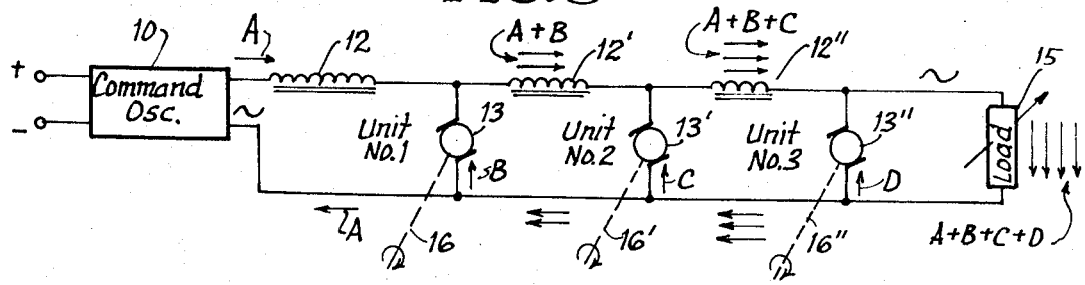
FIG. 3 is a conventionalized showing of a preferred embodiment of the invention with the generators connected in cascade.

In the system illustrated in FIG. 3 a single command source 10 provides an exciting current indicated by the arrow A through each of the series fields 12, 12′ and 12″ of three generator units similar to the one described in connection with FIGS. 1 and 2 and here connected in cascade to the load 15. The armatures 13, 13′ and 13″ are connected to be driven by shafts 16, 16″ and 16″ which may derive their rotation from a single prime mover or individual prime movers. Inspection of FIG. 3 clearly shows that the output current B of unit number 1 passes through the field 12′ of unit number 2, the field 12″ of unit number 3 and through the load 15. In a similar manner the current C generated by the number 2 unit passes through the load 15. Generating unit number 3 being the last in cascade, the current $D$ generated thereby merely passes through the load 15. The fact that the power developed in each stage is added to the power output of the system is a spectacular advantage of the present invention. Heretofore, electrically excited generators were connected in cascade the exciting power has been lost. As indicated in FIG. 3 the field windings 12, 12' and 12" of successive stages must carry more current than the previous generator field. The number of turns can be reduced as indicated in FIG. 3 and the wire gauge decreased to provide for optimum power. Fortunately, commutation benefits with higher field current and reduced number of turns. It is thus evident that multistage cascading permits the input electrical power to remain small while salvaging all of the electrical energy in the system except common $I^2R$ loss.

The speed range of the synchropolar generator of the present invention is quite large in the sense that a two-pole generator operates on 7,000 to 12,000 r.p.m. with but a small variation in gain. By using diodes or other electronic means for commutation purposes this range can easily be expanded.

Figure 4:
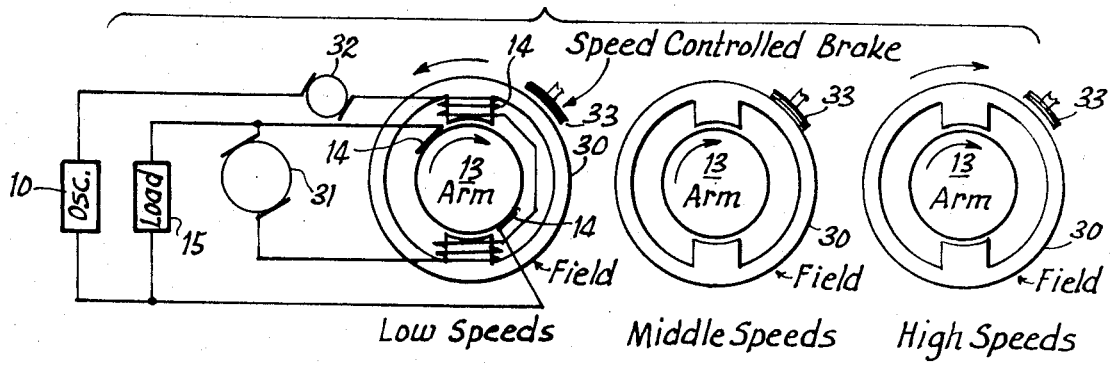
FIG. 4 shows schematically how three speed ranges may be obtained by changing the manner by which the relative rotation between the field and the armature is achieved.

FIG. 4 is a highly conventionalized showing of a three-speed range system mechanically accomplished by the manner in which the relative rotation between the field 12 and the armature 13 is accomplished. At low speeds the housing 30 and the armature 13 are mechanically rotated in opposite directions to achieve the desired relative rotation between the field 12 and the armature 13. A slip ring assembly 31 connects one terminal of the field 12 to the load 15 and to one of the brushes 14, the other brush 14 being connected directly to the other side of the load 15 and to the oscillator 10. A similar slip ring assembly 32 serves to connect the other terminal of the field 12 direct to the command source 10. It will be noted that a speed controlled brake 33 is out of contact with the field supporting structure 30. At middle speeds the brake 33 holds the field supporting structure 30 against rotation and, of course, its mechanical drive for the structure 30 is disconnected in any well-known manner. At high speeds the brake 33 is released and the field support structure 30 is rotated by any conventional means in the same direction as the armature 13 to achieve the desired relative rotation. It will be recognized that this arrangement whereby different relative speeds are secured by a combination of electrical mechanical features is roughly analogous to the techniques employed in the spinner motor.

It will be obvious to those skilled in the art that a portion of the field 12 may be included in the output circuit of the armature 13.

The embodiments described for the purpose of disclosing the fundamental features of the invention are not to be taken as limiting since many changes and adaptations will be obvious to those skilled in the art without departing from the scope of the appended claims.

What I claim is:

1. In a variable speed constant frequency power generating system the combination comprising a plurality of dynamoelectric machines each having laminated pole and armature structures provided with the windings, commutator and brushes of a conventional series wound direct current motor and an alternating current command power source connected across the series connected windings of a first one of said machines; said machines cascaded by connecting the brushes of each machine across the series connected windings of the next succeeding machine with the brushes of the final machine in the cascade connected to a load circuit, whereby all of the field windings of the cascaded machines are in series with said load circuit, whereby when the armatures of each of said machines is mechanically rotated relative to the pole winding of said machine at a speed in the direction of and in excess of the motor action induced by said command source, electric power having the frequency of the command power is available across the brushes of each of said armatures and the power developed by each machine is added to the power of said command source to appear summed together in said load circuit.

2. A power generating system in accordance with claim 1 in which said command source is a DC-to-AC inverter and in which a storage battery powers said command source.

3. A power generating system in accordance with claim 1 in which the field winding of each successive machine has a reduced number of turns to provide substantially the same number of ampere turns for each of the cascaded machines.